US007750997B2

(12) United States Patent
Chen et al.

(10) Patent No.: US 7,750,997 B2
(45) Date of Patent: Jul. 6, 2010

(54) DISPLAYING METHOD, DISPLAY DEVICE, DISPLAY PANEL AND COLOR FILTER DEVICE

(75) Inventors: Fu-Cheng Chen, Tainan County (TW); Chao-Lien Lin, Tainan County (TW); Cheng-Jen Chu, Tainan County (TW); Chung-Kuang Wei, Tainan County (TW)

(73) Assignee: Chi Mei Optoelectronics Corp., Taiwan (CN)

( * ) Notice: Subject to any disclaimer, the term of this patent is extended or adjusted under 35 U.S.C. 154(b) by 744 days.

(21) Appl. No.: 11/141,782

(22) Filed: May 31, 2005

(65) Prior Publication Data

US 2006/0007105 A1 Jan. 12, 2006

(30) Foreign Application Priority Data

Jun. 16, 2004 (TW) .............................. 93117280 A

(51) Int. Cl.
*G02F 1/1335* (2006.01)

(52) U.S. Cl. ...................................................... 349/106

(58) Field of Classification Search .......... 349/106–109
See application file for complete search history.

(56) References Cited

U.S. PATENT DOCUMENTS 4,800,375 A * 1/1989 Silverstein et al. .......... 345/694

* cited by examiner

*Primary Examiner*—James A Dudek
(74) *Attorney, Agent, or Firm*—Townsend and Townsend and Crew LLP

(57) ABSTRACT

A displaying method and device. The display device includes a back light module and a display panel. The back light module emits at least M color lights. The display panel includes a plurality of pixel areas arranged in array structure, wherein each pixel area comprises N color filters, and at least one of the color filters is for passing through a plurality of primary color lights. In the displaying method, the back light module provides at least M color lights in a frame time, and a frame is displayed by arranging the M color lights and the N color filters in each pixel area, wherein M≧2 and N≧2. Moreover, the display panel may include an active component array substrate, a liquid crystal layer and a color filter substrate. In addition, any two adjacent pixel areas can share at least one color filter.

18 Claims, 5 Drawing Sheets

200

DISPLAYING METHOD, DISPLAY DEVICE, DISPLAY PANEL AND COLOR FILTER DEVICE

BACKGROUND OF THE INVENTION

The present invention generally relates to flat panel displays. In particular, the present invention provides a displaying method, a display device, a color filter device and a display panel. More particularly, the present invention provides a displaying method performed by arranging certain color back lights and color filters for displaying, a related display device, a color filter device, and a resulting display panel.

In recent years, the visual display device of a personal computing electronic device has greatly improved concurrent with the development of the semiconductor elements and technologies. Until now, since the cathode ray tube (CRT) has a good display quality and low price, it has dominated the market of display device in these days. The CRT, however, has certain limitations. That is, since the CRT occupies a large space, has a heavy weight and consumes a great quantity of power, it is often not suitable for personal use or for connecting with several computer terminals. Moreover, it is also not suitable for a portable personal electronic device, which should be light, thin, small, and has low power consumption. Therefore, a thin film transistor (TFT) liquid crystal display (LCD) having characteristics of high image quality, minimum space requirement, low power consumption and low radiation is the trend in the display device market.

FIG. 1 is a schematic cross-sectional view of a basic structure of a conventional LCD, and FIG. 2 is a schematic top view of the LCD illustrated in FIG. 1. Referring to FIG. 1 and FIG. 2, the conventional LCD 100 is mainly constructed by a back light module 110 and a LCD panel 120. The LCD panel 120 is disposed over light exit plane 112 of the back light module 110. The LCD panel 120 is generally constructed by an active component array substrate 130, a color filter substrate 140, and a liquid crystal layer 150. The liquid crystal layer 150 is disposed between the active component array substrate 130 and the color filter substrate 140. The frame displayed by the LCD 100 is constructed by a plurality of array arranged pixels 160, wherein each pixel 160 comprises sub-pixels 162, 164 and 166 having red (R), green (G) and blue (B) color filters disposed thereon respectively. The color displayed by each pixel 160 is determined by the color of the light from the back light module 110 and the color of the color filters.

Most conventional LCDs use a matrix displaying method. In the matrix displaying method, a white light W is emitted from the back light module 110. After the white light W passes through the color filters of the sub-pixels 162, 164 and 166, red light R, green light G and blue light B are formed respectively. Meanwhile, the transmittance of the light of each of the sub-pixels 162, 164 and 166 is decided by the rotation angle of the liquid crystal therein. Therefore, the color displayed in each pixel 160 of the frame is determined by mixing the red light R, the green light G and the blue light B. FIG. 3 is a schematic view illustrating a displaying method of a conventional LCD. Referring to FIG. 3, the horizontal axis represents the space ratio of each color image, and the vertical axis represents the time ratio of each color image in a unit frame time. As shown in FIG. 3, it is noted that in the conventional displaying method, the space utility rate of each color image is only ⅓ since each color filter only occupies ⅓ space of each pixel.

In order to solve the problem, a color sequence displaying method has been developed. In the LCD using the color sequence method, the color filters are not required. In addition, the cold cathode fluorescence lamp tube (CCFL) of the back light module may emit red, green and blue color lights (i.e., three primary color lights), wherein these color lights may be switched rapidly. It is noted that, with the aid of the phenomenon of persistence of vision of the human eye, the LCD using the color sequence displaying method may display a full-color frame by switching each color image with high frequency. FIG. 4 is a schematic view illustrating another displaying method of a conventional LCD. Referring to FIG. 4, the horizontal axis represents the space ratio of each color image, and the vertical axis represents the time ratio of each color image in a unit frame time. As shown in FIG. 4, it is noted that, if the LCD using the color sequence displaying method has the same unit frame time as the conventional matrix displaying method, the switching frequency of each color light of the back light module shown in FIG. 4 must be three times of the scan frequency of the LCD using the matrix displaying method. Therefore, the design and manufacture of the LCD using the color sequence displaying method is often more difficult to achieve.

From the above, it is seen that improved techniques for displaying visual features is highly desirable.

BRIEF SUMMARY OF THE INVENTION

According to the present invention, techniques generally related to flat panel displays are provided. In particular, the present invention provides a displaying method, a display device, a color filter device and a display panel. More particularly, the present invention relates to provides a displaying method performed by arranging the certain color back lights and the color filters for displaying, and a related display device, a color filter device, and a resulting display panel using thereof.

The present invention provides a displaying method for increasing the space utility rate of each color light in the display device and reducing the scan frequency of the back light module according to a specific embodiment.

In addition, the present invention provides a display device for increasing the space utility rate of each color light in the display device and reducing the scan frequency of the back light module according to an alternative embodiment.

Moreover, the present invention provides a color filter device for increasing the space utility rate of each color light in the display device and reducing the scan frequency of the back light module according to an alternative embodiment.

Furthermore, the present invention provides a display panel for increasing the space utility rate of each color light in the display device and reducing the scan frequency of the back light module according to yet an alternative embodiment.

According to a specific embodiment of the present invention, a displaying method for a display device comprising a back light module and a display panel is provided. The back light module emits at least M color lights. The display panel comprises a plurality of pixel areas arranged in array structure each pixel area comprises N color filters. At least one of the color filters is provided for passing through a plurality of primary color lights.

Moreover, in a frame time that a frame is displayed by the displaying method, the back light module provides at least M color lights, and the frame is displayed by arranging the M color lights and the N color filters in each pixel area, wherein M=2 and N=2.

In a specific embodiment of the present invention, for example, where M=2 and N=2, the frame time comprises a first frame time and a second frame time. The back light module emits a first color light in the first frame time, and emits a second color light in the second frame time. In addition, a first color filter and a second color filter are disposed in each pixel area. The first color filter is adapted for passing through a first primary color light and a second primary color light, and the second color filter is adapted for passing through the first primary color light and a third primary color light.

The first color light comprises a second primary color light and a third primary color light, and the second color light comprises a first primary color light. In another embodiment, the first color light comprises a first primary color light, and the second color light comprises a second primary color light and a third primary color light.

The first primary color light, second primary color light, and third primary color light can be, for example, green light, red light, and blue light respectively, or blue light, red light, and green light respectively, or red light, green light, and blue light respectively, according to specific embodiments.

In yet another embodiment of the present invention, for example, M=3 and N=3, and the frame time comprises a first frame time, a second frame time and a third frame time. The back light module emits a first color light in the first frame time, a second color light in the second frame time, and a third color light in the third frame time. In addition, a first color filter, a second color filter and a third color filter may be disposed in each pixel area. The first color filter is adapted for passing through a first primary color light, the second color filter is adapted for passing through a second primary color light, and the third color filter is adapted for passing through a third primary color light.

The first color light comprises a first primary color light, the second color light comprises a second primary color light, and the third color light comprises a third primary color light. In another embodiment, the first color light comprises a first primary color light and a second primary color light; the second color light comprises a second primary color light and a third primary color light; and the third color light comprises a third primary color light and a first primary color light.

The first primary color light, second primary color light and third primary color light comprise red light, green light and blue light according to a specific embodiment.

According to another embodiment of the present invention, a display device is provided. The display device comprises a back light module and a display panel. The back light module is adapted for emitting M color lights in a frame time that a frame is displayed by the display device. The display panel comprises a plurality of pixel area, wherein each pixel area comprises N color filters, and at least one of the color filters is adapted for passing through a plurality of primary color lights, wherein M=2 and N=2 according to a specific embodiment.

In a specific embodiment of the present invention, the frame time comprises a first frame time and a second frame time. The back light module emits a first color light in the first frame time, and emits a second color light in the second frame time. In addition, a first color filter and a second color filter are disposed in each pixel area. The first color filter is adapted for passing through a first primary color light and a second primary color light, and the second color filter is adapted for passing through the first primary color light and a third primary color light.

In addition, the first color light comprises one or two of the first primary color light, second primary color light and third primary color light according to a specific embodiment. The second color light may also comprise one or two of the first primary color light, second primary color light and third primary color light. The first primary color light, second primary color light and third primary color light may be one of red light, green light, blue light, cyan light, yellow light and magenta light.

In an alternative embodiment, the frame time comprises, for example, a first frame time, a second frame time and a third frame time . The back light module emits a first color light in the first frame time, a second color light in the second frame time, and a third color light in the third frame time. In addition, a first color filter, a second color filter and a third color filter are disposed in each pixel area. The first color filter is adapted for passing through a first primary color light, the second color filter is adapted for passing through a second primary color light, and the third color filter is adapted for pass through a third primary color light.

In addition, for example, the first color light, second color light and third color light comprise one or two of the first primary color light, second primary color light and third primary color light respectively. The first primary color light, second primary color light and third primary color light can be one of red light, green light, blue light, cyan light, yellow light and magenta light respectively.

According to another embodiment of the present invention, a display device comprising a back light module and a display panel is provided. The display panel includes an active component array substrate, a liquid crystal layer and a color filter substrate. The color filter substrate has a plurality of pixel areas, wherein each pixel area comprises a plurality of color filters, and at least one of the color filters in each pixel area is adapted for passing through a plurality of the primary color lights. In addition, any two adjacent pixel areas share at least one color filter.

In addition, the primary color lights can be one of red light, green light, blue light, cyan light, yellow light and magenta light respectively.

According to another embodiment of the present invention, a color filter device comprising a substrate and a plurality of pixel areas is provided. The pixel areas are arranged over the substrate, wherein a plurality of color filters is disposed in each pixel area, and at least one of the color filters is adapted for passing through a plurality of primary color lights.

In an embodiment of the present invention, the primary color lights can be one of red light, green light, blue light, cyan light, yellow light and magenta light respectively. The color filter device may further comprise, for example, a light shielding layer and a plurality of transistors disposed over the substrate respectively.

According to another embodiment of the present invention, a display panel comprising an active component array substrate and a color filter substrate is provided. The color filter substrate is opposite to the active array substrate. The color filter substrate comprises a plurality of pixel areas regularly arranged over the color filter substrate. In addition, a plurality of color filters is disposed in each pixel area, wherein at least one of the color filters is adapted for passing through a plurality of the primary color lights.

In an embodiment of the present invention, the primary color lights are for example one of red light, green light, blue light, cyan light, yellow light and magenta light respectively. The display panel further comprises a liquid crystal layer disposed between the active component array substrate and the color filter substrate.

Accordingly, in the displaying method, display device, color filter device and display panel of the present invention, by arranging the color filters and the back lights, the scan frequency of switching the color lights of the back light module is low and is only two times of the scan frequency of the display device using the conventional matrix displaying method, and is lower than the scan frequency of the display device using the conventional color sequence method. In addition, the utility rate back light can be enhanced greatly. Moreover, since the adjacent pixel areas share a portion of the color filters, the resolution can also be increased.

One or part or all of these and other features and advantages of the present invention will become readily apparent to those skilled in this art from the following description wherein there is shown and described an embodiment of this invention, simply by way of illustration of one of the modes best suited to carry out the invention. As it will be realized, the invention is capable of different embodiments, and its several details are capable of modifications in various, obvious aspects all without departing from the invention. One or more of these features and/or advantages or any combination of these may exist in one or more embodiments of the present invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE INVENTION

Figure 1:
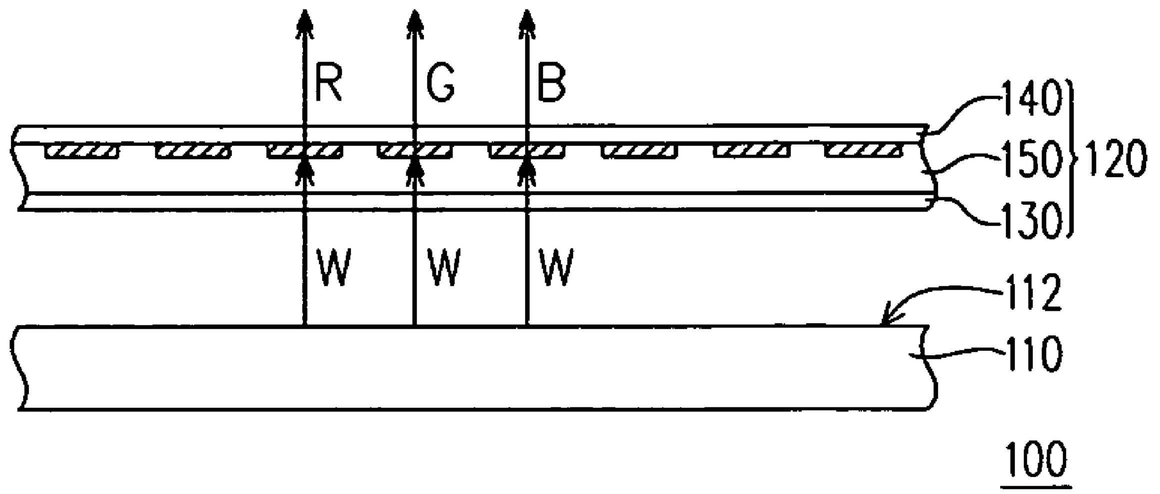
FIG. 1 (PRIOR ART)
FIG. 1 is a simplified schematic cross-sectional view of a basic structure of a conventional LCD.
Figure 2:
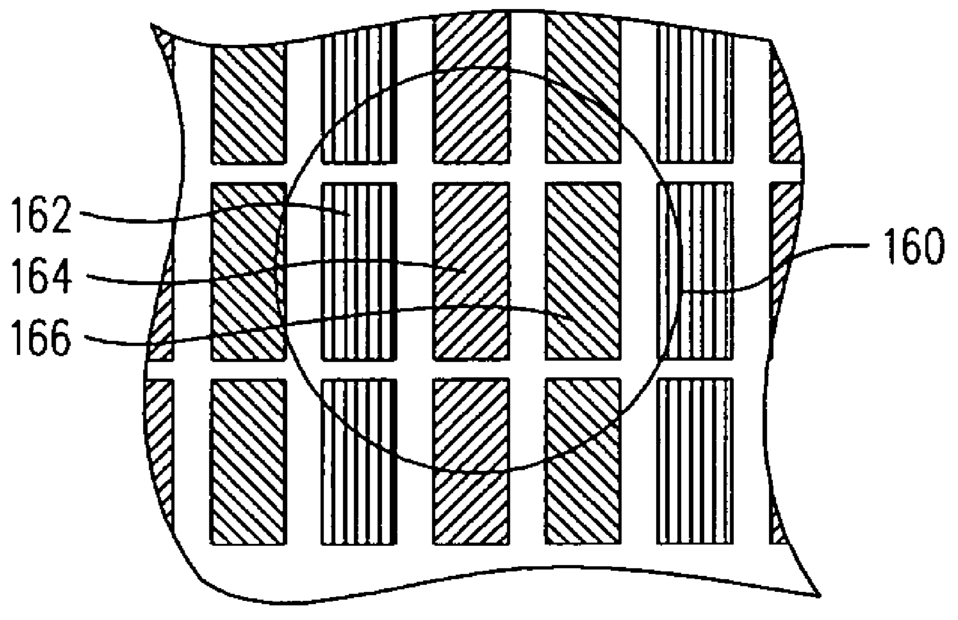
FIG. 2 (PRIOR ART)
FIG. 2 is a simplified schematic top view of the LCD illustrated in FIG. 1.
Figure 3:
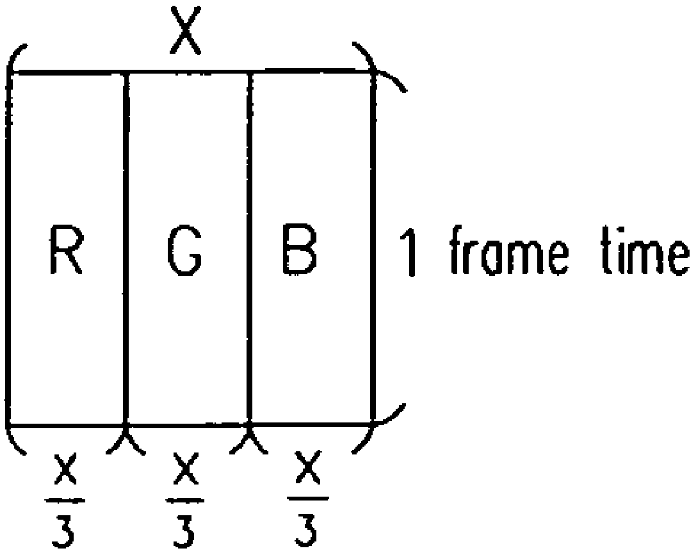
FIG. 3 is a simplified schematic view illustrating a displaying method of a conventional LCD according to an embodiment of the present invention.
Figure 4:
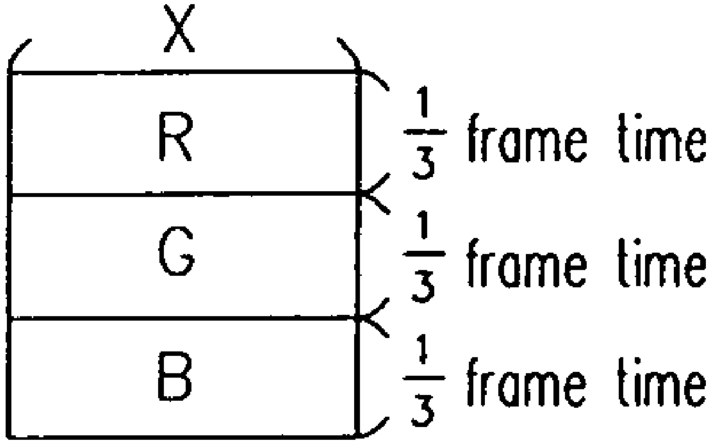
FIG. 4 is a simplified schematic view illustrating another displaying method of a conventional LCD.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to the present invention, techniques generally related to flat panel displays are provided. In particular, the present invention provides a displaying method, a display device, a color filter device and a display panel. More particularly, the present invention relates to provides a displaying method performed by arranging the certain color back lights and the color filters for displaying, and a related display device, a color filter device, and a resulting display panel using thereof.

The displaying method of the present invention is suitable for a display device, for example, a LCD. In an embodiment, the displaying method of the present invention is also suitable for a display device comprising a back light module and a display panel. The back light module is provided for emitting M color lights (wherein M=2) in a frame time that a frame is displayed by the display device, wherein the distribution of wavelength of each color light may be continuous or discontinuous. In other words, the color light emitted by the back light module may comprise only one of a red light, a green light, or a blue light, or may comprise two of the three primary color lights simultaneously, or even may comprise other color light designed according to the displaying requirement. The light source of the back light module comprises, for example, a light emitting diode (LED), a cold cathode lamp tube or other light source suitable for rapidly switching between different color lights.

The display panel comprises a plurality of pixel areas arranged in array, wherein N color filters (N=2) are disposed in each of the pixel areas, and at least one of the color filters is adapted for passing through a plurality of primary color lights. The wavelength distribution of the primary color lights passed by the color filters may be mutually continuous or discontinuous.

Moreover, when the display device is a LCD, the display panel comprises an active component array substrate, a liquid crystal layer and a color filter substrate. The color filter substrate comprises a plurality of pixel areas, wherein each pixel area comprises a plurality of color filters, and at least one of the color filters in each pixel area is adapted for passing through a plurality of primary color lights. In addition, any two of the pixel areas in neighbor may share at least one of the color filters.

In another embodiment of the present invention, the displaying method can also be adapted for a color filter device comprising, for example, a substrate and a plurality of pixel areas. The pixel areas are arranged over the substrate. In addition, a plurality of color filters is disposed in each pixel area. At least one of the color filters is provided for passing through a plurality of the primary color lights. Generally, in some conventional LCD, the color filters are disposed on an active component array substrate, and the technology is called "color filter on array" (COA). When the present invention is adapted in the COA LCD, the color filters described above may be disposed in each pixel area, and wherein at least one color filter may be adapted for passing through a plurality of primary color lights. Thus, space utility rate for each color light can be enhanced.

Moreover, in the color filter device described above, each primary color light may comprise one of a red light, a green light, a blue light, a cyan light, a yellow light and a magenta light. The color filter device may further comprise a light shielding layer and a plurality of transistors disposed over the substrate respectively. The light shielding layer can comprise, for example, black matrix (BM). In addition, each color filter may comprise a corresponding transistor respectively, and the transistor can comprise a thin film transistor (TFT).

In another embodiment of the present invention, the displaying method can also be adapted for a display panel comprising, for example, an active component array substrate and a color filter substrate opposite to the active component array substrate. The color filter substrate may comprise a plurality of pixel areas regularly arranged over the color filter substrate. In addition, a plurality of color filters is disposed in each pixel, wherein at least one of the color filters is provided for passing through a plurality of the primary color lights.

Moreover, in the display panel described above, each primary color light may comprise one of a red light, a green light, a blue light, a cyan light, a yellow light and a magenta light. The display panel may further comprise, for example, a liquid crystal layer disposed between the active component array substrate and the color filter substrate.

In an embodiment of the present invention, the displaying method comprises the following steps. First, in a frame time that a frame is displayed by the display device, at least M color lights are provided by the back light module, and the frame is displayed by arranging the M color lights and the N color filters in each pixel area. When the M color lights are provided by the back light module, whether each color light may be seen by the user via the color filter is determined by the wavelength of the color light passing the color filters. Hereinafter, several embodiments of the invention will be described as examples; however, the scope of the displaying method of the present invention should not be limited thereto.

Figure 5:
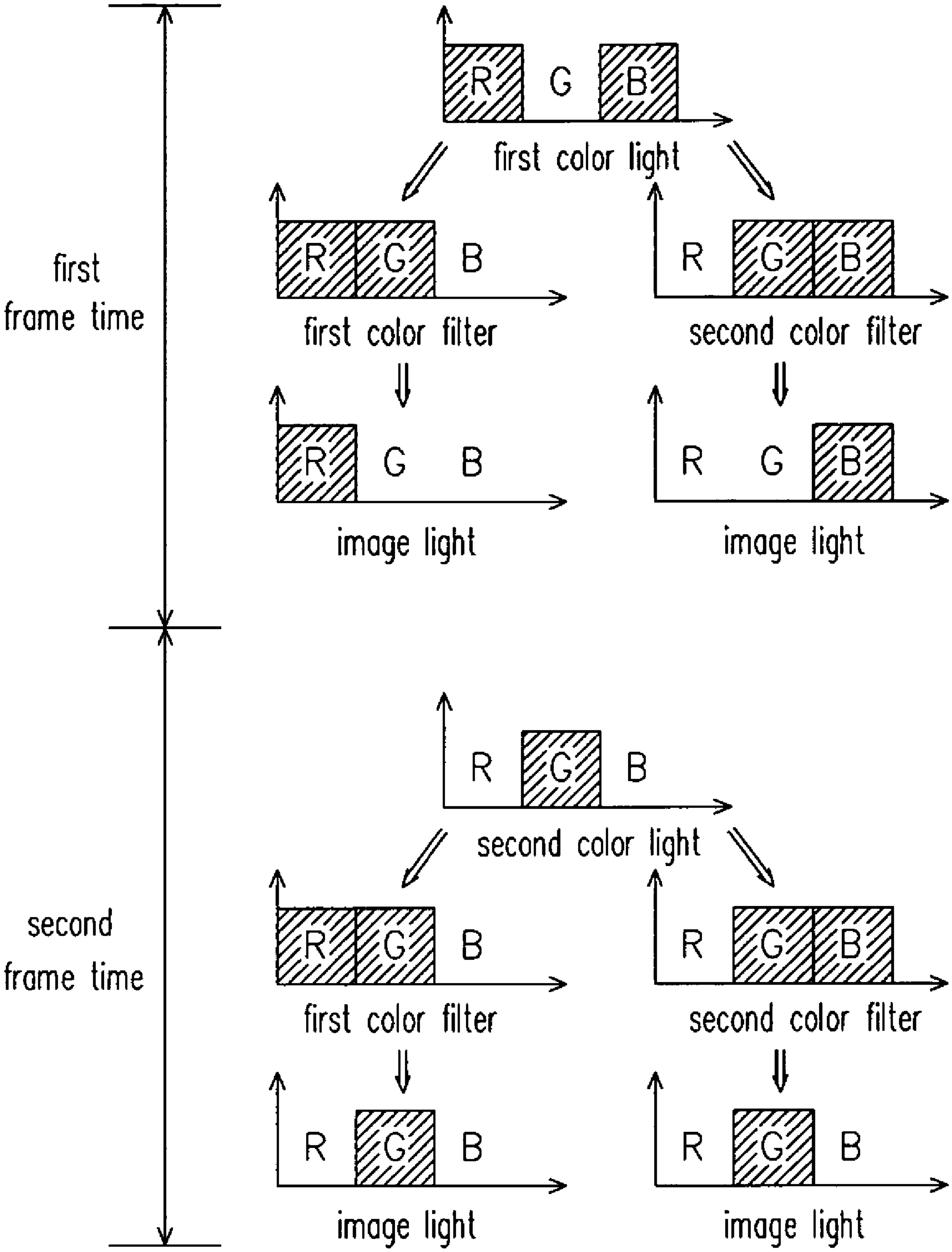
FIG. 5 is a simplified schematic view illustrating a displaying method according to an embodiment of the present invention.

FIG. 5 is a schematic view illustrating a displaying method according to an embodiment of the present invention. Referring to FIG. 5, in the present embodiment, M=2, which relates to the number of color lights, and N=2, which relates to the number of color filters. Therefore, the frame time described above comprises, for example, a first frame time and a second frame time. The back light module emits a first color light in the first frame time. In the embodiment shown in FIG. 5, the wavelength distribution of the first color light comprises a wavelength ranged in red light and blue light. The back light module emits a second color light in the second frame time. As shown in FIG. 5, the wavelength distribution of the second color light comprises a wavelength ranged in green light. In addition, a first color filter and a second color filter are disposed in each pixel area of the display device, wherein the first color filter is adapted for passing through red light and green light, and the second color filter is adapted for passing through green light and blue light.

Furthermore, in the first frame time, the back light module emits red light and blue light. However, only the red light can pass through the first color filter, therefore, only a red image is displayed in the first color filter of each pixel in the first frame time. Similarly, in the first frame time, only the blue light from the back light module passes through the second color filter, therefore, a blue image is displayed in the second color filter of each pixel in the first frame time. Besides, in the second frame time, the back light module emits green light. Since the green light passes through the first color filter and the second color filter, a green image is displayed in the first color filter or the second color filter of each pixel in the second frame time.

Accordingly, in the displaying method of the embodiment described above, a full-color image will be displayed in each pixel as the red and blue image displayed in the first frame time and the green image displayed in the second frame time are combined. In addition, the switching frequency of the back light module of the present invention is only two times than that of the display device using the conventional matrix displaying method, and thus is lower than that of the display device using the conventional color sequence displaying method.

Figure 6:
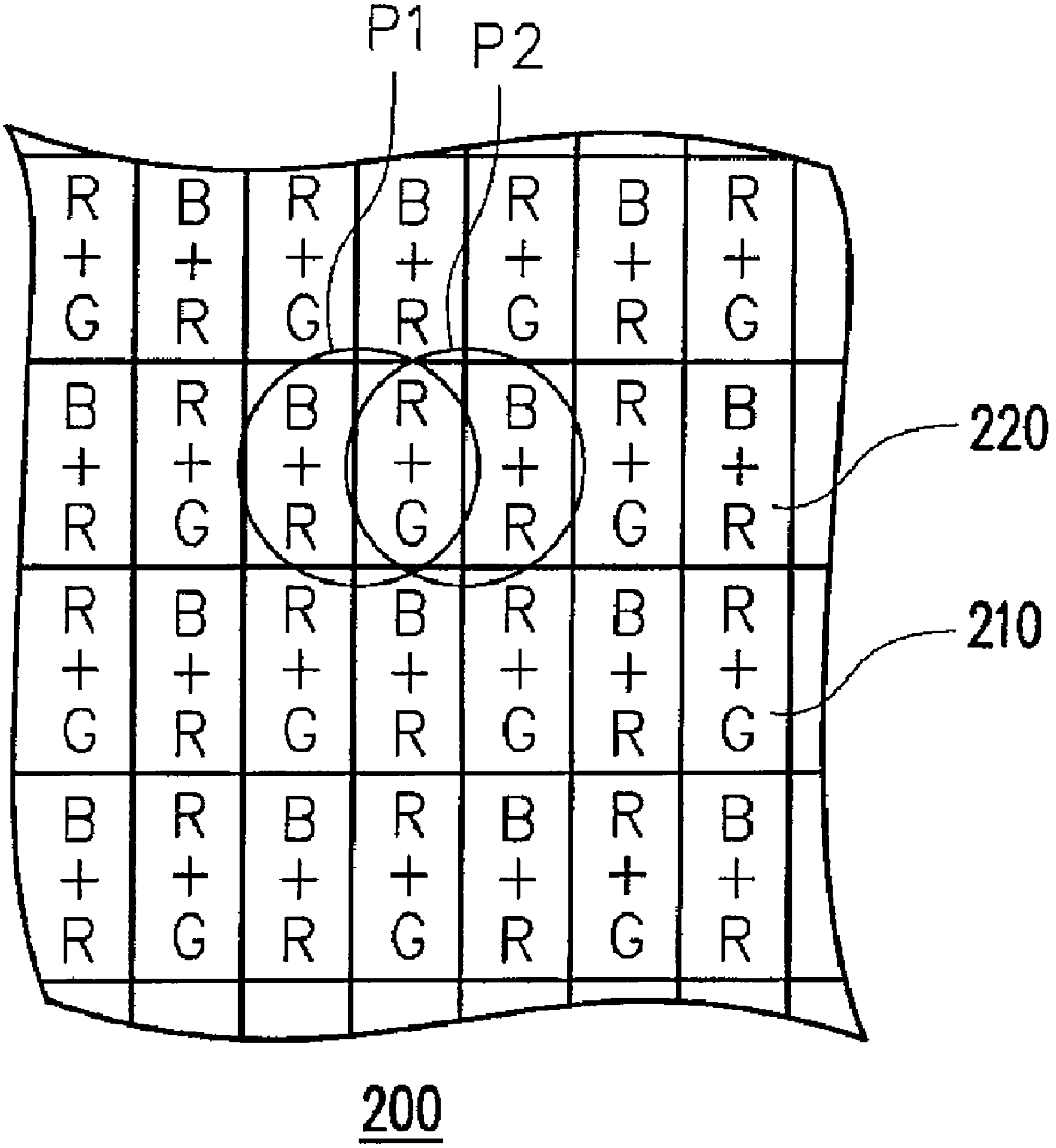
FIG. 6 is a simplified schematic view of a color filter layout structure according to an embodiment of the present invention.

FIG. 6 is a schematic view of a color filter layout structure according to an embodiment of the present invention. The display device illustrated in FIG. 6 is compatible for the displaying method of the embodiment described above. The color filter layout structure 200 of the display device comprises a plurality of first color filters 210 and a plurality of second color filters 220. The first color filters 210 and the second color filters 220 are arranged in a spatial array structure, wherein the second color filter 220 and the first color filter 210 may be interlaced. In other words, the second color filters 220 are disposed around each first color filter 210, and vice versa. The first color filter 210 is adapted for passing through a first primary color light and a second primary color light. The second color filter 220 is adapted for passing through a first primary color light and a third primary color light.

In an embodiment of the present invention, the first primary color light, the second primary color light and the third primary color light are green light, red light and blue light respectively. As shown in FIG. 6, since each first color filter 210 is surrounded by the second color filters 220, the pixel P1 and pixel P2 may share a first color filter 210. That is, a portion of pixel P1 and a portion of pixel P2 have a common overlap region, which is associated with the first color filter. The first color filter is provided for a portion of each of these pixels P1 and P2 according to a specific embodiment. Therefore, the resolution in horizontal direction of the display panel of the present invention is two times than that of the conventional technology. In other words, the number of the data lines required to drive each pixel of the present invention is reduced, compared to the conventional technology under the same resolution.

Moreover, the first primary color light, the second primary color light and the third primary color light can be one of red light, green light, blue light, cyan light, yellow light and magenta light respectively.

In addition, when a frame time that a frame is displayed by the display device comprises a first frame time and a second frame time, the back light module emits a first color light in the first frame time, and emits a second color light in the second frame time. The first color light and the second color light comprise one or two of the first primary color light, second primary color light and third primary color light respectively.

In another embodiment of the present invention, when a frame time comprises a first frame time, a second frame time and a third frame time, the back light module emits a first color light in a first frame time, emits a second color light in the second frame time, and emits a third color light in the third frame time. The first color light, the second color light and the third color light comprise one or two of the first primary color light, second primary color light and third primary color light respectively.

Figure 7:
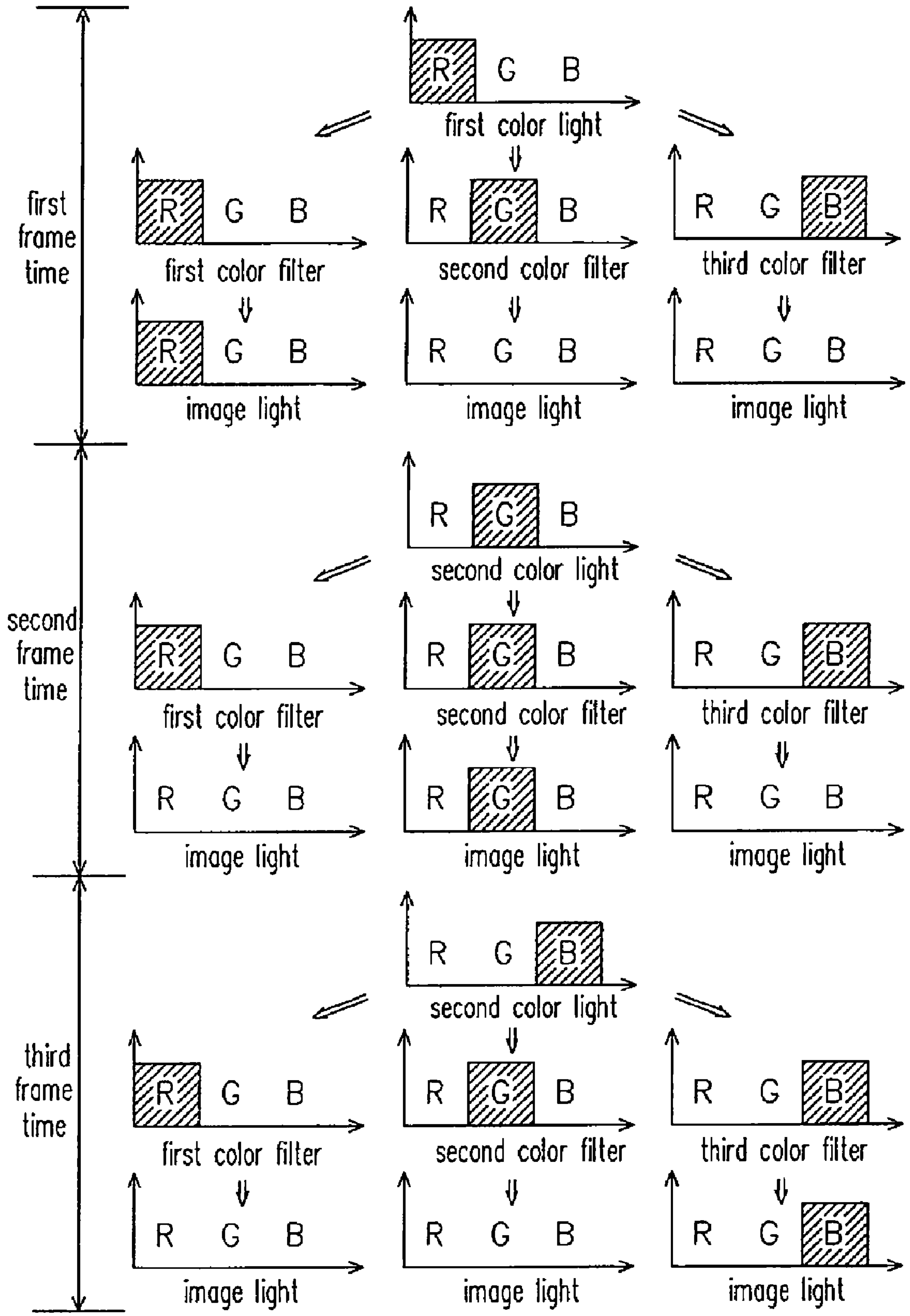
FIG. 7 is a simplified schematic view illustrating a displaying method according to another embodiment of the present invention.

FIG. 7 is a schematic view illustrating a displaying method according to another embodiment of the present invention. In the embodiment shown in FIG. 7, M=3 and N=3 respectively. The frame time comprises a first frame time, a second frame time and a third frame time. The back light module emits a first color light in the first frame time, emits a second color light in the second frame time, and emits a third color light in the third frame time. In addition, a first color filter, a second color filter and a third color filter are disposed in each pixel area. The first color filter, the second color filter, and the third color filter are adapted for passing through a red light, a green light and a blue light respectively.

In an embodiment of the present invention, the first color light comprises a red light, the second color light comprises a green light, and the third color light comprises a blue light. The first primary color light, the second primary color light and the third primary color light comprise red light, green light and blue light. In addition, the wavelength distribution of the first color light, the second color light and the third color light can be either continuous or discontinuous.

Accordingly, the back light module emits a red light in the first frame time, thus only the first color filter of each pixel displays a red image in the first frame time, but the light can not pass through the second color filter and the third color filter. In addition, only the second color filter of each pixel displays a green image in the second frame time. Moreover, only the third color filter of each pixel displays a green image in the third frame time.

In the embodiments of the present invention described above, the light source may emit three primary color lights such as red, green and blue light or cyan, yellow and magenta light. However, in another embodiment of the present invention, the wavelength distribution of each color light may be optimized to achieve a better color saturation than that of the conventional technology. In addition, the time length of switching the frame time of each color light of the back light module can be arranged in average or be lengthened or shortened if necessary.

It should be noted that, the application of the displaying method and the display device of the present invention is not limited in LCD. It can also be adapted for other display device requiring a back light module and a color filter for displaying image.

Accordingly, in the displaying method and display device of the present invention, a back light module switchable between several color lights is incorporated with a plurality of color filters, thus a full-color image can be obtained. In the present invention, the scan frequency for switching the color lights of the back light module can be reduced. For example, the scan frequency is only two times of the conventional matrix displaying method and is lower than the scan frequency of the conventional color sequence method. In addition, since one or more primary color lights are allowed to pass through each color filter, the utility rate of the back light will be enhanced greatly. Moreover, in the present invention, the two adjacent pixel areas share a portion of color filters. For example, when the first color filter and second color filter are interlaced, the two adjacent pixels will share a same color filter. Thus, the whole resolution is increased.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:

a back light module; and a display panel coupled to the backlight module, the display panel comprising:

an active component array substrate;

a liquid crystal layer coupled to the active component array substrate; and a color filter substrate comprising a plurality of pixel areas coupled to the liquid crystal layer each of the pixel areas having a plurality of color filters, at least one of the color filters in each of the pixel areas being adapted to pass through a plurality of primary color lights;

wherein the display device is configured to display two overlapping pixels including two respective pixel areas, the two pixel areas being in neighbor arrangement having a common overlap region, wherein a first pixel area includes the common overlap region and a first region, a second pixel area includes the common overlap region and a second region, and the common region includes at least one of the color filters.

2. The display device of claim 1, wherein each of the primary color lights comprises one of a red light, a green light, a blue light, a cyan light, a yellow light, and a magenta light.

3. A display panel, comprising:

a backlight module;

an active component array substrate;

a color filter substrate coupled to the active array substrate, the color filter substrate comprises a plurality of pixel areas regularly and spatially arranged over the color filter substrate; and a plurality of color filters associated with each of the pixel areas, and at least one of the color filters being adapted for blocking only one of primary color lights;

wherein the backlight module includes at least a light source configured to emit light of only two primary colors that, in some cases, through the at least one color filter adapted for blocking only one primary color light, displays light of only one primary color.

4. The display panel of claim 3, wherein each of the primary color lights comprises one of a red light, a green light, a blue light, a cyan light, a yellow light, and a magenta light.

5. The display panel of claim 3, further comprising:

a liquid crystal layer disposed between the active component array substrate and the color filter substrate.

6. A display device, comprising:

a substrate;

a plurality of pixel areas arranged over the substrate; and

Y color filters associated with each of the pixel areas, wherein each of the pixel areas is configured to display X primary color lights, wherein both X and Y are integer and X>Y.

7. The display device of claim 6, wherein each of the primary color lights comprises one of a red light, a green light, a blue light, a cyan light, a yellow light and a magenta light.

8. A display panel, comprising:

an active component array substrate; and a color filter substrate coupled to the active array substrate, wherein the active component array substrate comprises a plurality of pixel areas regularly and spatially arranged, the color filter substrate comprises Y color filters associated with each of the pixel areas, and each of the pixel areas is configured to display X primary color lights, wherein both X and Y are integers and X>Y.

9. The display panel of claim 8, wherein each of the primary color lights comprises one of a red light, a green light, a blue light, a cyan light, a yellow light, and a magenta light.

10. The display panel of claim 8, further comprising:

a liquid crystal layer disposed between the active component array substrate and the color filter substrate.

11. The display device of claim 6, wherein at least two of the pixel areas in neighbor arrangement have a common overlap region.

12. The display device of claim 11, wherein a first pixel area includes the common overlap region and a first region, a second pixel area includes the common overlap region and a second region, and the common region includes at least one of the color filters.

13. The display device of claim 6, wherein at least one of the color filters is configured for blocking only one of primary color lights.

14. The display device of claim 6 further comprising a back light module, wherein back light module being adapted to emit at least two or more primary colors.

15. The display panel of claim 8, wherein at least two of the pixel areas in neighbor arrangement have a common overlap region.

16. The display panel of claim 15, wherein a first pixel area includes the common overlap region and a first region, a second pixel area includes the common overlap region and a second region, and the common region includes at least one of the color filters.

17. The display panel of claim 8, wherein at least one of the color filters is configured for blocking only one of primary color lights.

18. The display panel of claim 8 further comprising a back light module configured to emit light of at least two or more primary colors.

* * * * *